(12) United States Patent
Klassen et al.

(10) Patent No.: US 10,717,542 B2
(45) Date of Patent: Jul. 21, 2020

(54) AIRCRAFT FUEL CELL HEAT USAGES

(71) Applicant: Zodiac Aerotechnics, Plaisir (FR)

(72) Inventors: Samuel Klassen, Haiger (DE); Franck Masset, Saint Georges Motel (FR); Andreas Hoogeveen, Enkhuizen (NL); Hanane Zraaia, Viry-Chatillon (FR); Loic Bouillo, Saint Just Saint Rambert (FR); Christian Thiry, Rueil-Malmaison (FR); Guillaume Gager, Toulouse (FR); Charles Foncin, Saint Cyr l'Ecole (FR); Jakub Landa, Plzen (CZ); Remko Schiphorst, Enkhuizen (NL)

(73) Assignee: Zodiac Aerotechnics, Plaisir (FR)

( * ) Notice: Subject to any disclaimer, the term of this patent is extended or adjusted under 35 U.S.C. 154(b) by 107 days.

(21) Appl. No.: 15/545,336

(22) PCT Filed: Jan. 22, 2016

(86) PCT No.: PCT/IB2016/050331
§ 371 (c)(1),
(2) Date: Jul. 21, 2017

(87) PCT Pub. No.: WO2016/116902
PCT Pub. Date: Jul. 28, 2016

(65) Prior Publication Data
US 2018/0002030 A1    Jan. 4, 2018

Related U.S. Application Data

(60) Provisional application No. 62/106,501, filed on Jan. 22, 2015, provisional application No. 62/106,452, filed on Jan. 22, 2015.

(51) Int. Cl.
*B64D 41/00* (2006.01)
*B64D 13/06* (2006.01)
(Continued)

(52) U.S. Cl.
CPC ............. *B64D 41/00* (2013.01); *B64C 1/1407* (2013.01); *B64C 1/18* (2013.01); *B64C 1/40* (2013.01);
(Continued)

(58) Field of Classification Search
CPC .................................................. H01M 8/04007
See application file for complete search history.

(56) References Cited

U.S. PATENT DOCUMENTS 3,740,905 A * 6/1973 Adams .................... B64C 1/067
52/404.3
7,108,229 B2 * 9/2006 Hoffjann ................ B64D 11/02
244/172.2

(Continued)

FOREIGN PATENT DOCUMENTS

CA          2700658 A1     4/2009
CN          103466092      12/2013
(Continued)

OTHER PUBLICATIONS

DE-102008062038-A1 translation (Year: 2019).*
(Continued)

*Primary Examiner* — Brian R Ohara
(74) *Attorney, Agent, or Firm* — Kilpatrick Townsend & Stockton LLP

(57) ABSTRACT

Embodiments of the present disclosure relate generally to the use of the fuel cell systems on board aircraft and other passenger transportation vehicles and to methods of using heat, air, and water generated by such fuel cell systems. The heat may be used to address condensation within the aircraft. The heat may be used to help evaporate excess water that would otherwise condense in the aircraft skin. The excess water collected may be used to create humidification for cabin air. In other examples, the heat, warmed air, or warmed
(Continued)

water may be delivered to other locations or heating systems for beneficial use.

6 Claims, 6 Drawing Sheets

(51) Int. Cl.
  *B64D 13/08* (2006.01)
  *B64C 1/14* (2006.01)
  *B64C 1/18* (2006.01)
  *B64C 1/40* (2006.01)
  *H01M 8/04007* (2016.01)

(52) U.S. Cl.
  CPC ............. *B64D 13/06* (2013.01); *B64D 13/08* (2013.01); *H01M 8/04007* (2013.01); *B64D 2013/0662* (2013.01); *B64D 2041/005* (2013.01); *H01M 2250/20* (2013.01); *Y02T 50/44* (2013.01); *Y02T 50/46* (2013.01); *Y02T 50/56* (2013.01); *Y02T 90/32* (2013.01); *Y02T 90/36* (2013.01)

(56) References Cited

U.S. PATENT DOCUMENTS

| | | |
|---|---|---|
| 8,141,185 B2 | 3/2012 | Hoffjann et al. |
| 2002/0168184 A1 | 11/2002 | Meisiek |
| 2004/0043276 A1 | 3/2004 | Hoffjann et al. |
| 2004/0057177 A1 | 3/2004 | Glahn et al. |
| 2006/0138278 A1 | 6/2006 | Gans |
| 2007/0172707 A1 | 7/2007 | Hoffjann et al. |
| 2008/0001026 A1 | 1/2008 | Hoffjann et al. |
| 2008/0038597 A1 | 2/2008 | Hoffjann et al. |
| 2008/0133076 A1 | 6/2008 | Formanski et al. |
| 2010/0193629 A1 | 8/2010 | Breit et al. |
| 2010/0221642 A1 | 9/2010 | Frahm et al. |
| 2013/0210329 A1 | 8/2013 | God et al. |
| 2014/0291449 A1 | 10/2014 | Knepple et al. |

FOREIGN PATENT DOCUMENTS

| | | | |
|---|---|---|---|
| DE | 102007008987 A1 | 8/2008 | |
| DE | 102006042300 B4 | 9/2008 | |
| DE | 102007054291 A1 | 4/2009 | |
| DE | 102008062038 A1 * | 6/2010 | ............. B64D 13/08 |
| DE | 102008062038 A1 | 6/2010 | |
| DE | 102011001267 A1 | 9/2012 | |
| DE | 102011119364 A1 | 5/2013 | |
| EP | 2213571 B1 | 8/2010 | |
| WO | 2006058774 A2 | 6/2006 | |
| WO | 2007039211 A1 | 4/2007 | |
| WO | 2007057188 A1 | 5/2007 | |
| WO | 2011089016 A2 | 7/2011 | |

OTHER PUBLICATIONS

MerriamWebster15545336 (Year: 2019).*
Europe Patent Application No. 18195742.4, Extended European Search Report, dated Jan. 29, 2019.
International Application No. PCT/IB2016/050331, Search Report and Written Opinion dated Apr. 22, 2016.
Europe Patent Application No. 16704938.6, Communication under Rule 71(3) EPC (allowance), dated Jun. 20, 2018.

* cited by examiner

AIRCRAFT FUEL CELL HEAT USAGES

CROSS REFERENCE TO RELATED APPLICATIONS

This application is the U.S. national stage entry of International Application Serial No. PCT/IB2016/050331, filed on Jan. 22, 2016, which application claims the benefit of U.S. Provisional Application Ser. No. 62/106,501, filed Jan. 22, 2015, titled "Skin Insulation Blankets Heating and Humidity Enrichment," and U.S. Provisional Application Ser. No. 61/106,452, filed Jan. 22, 2015, titled "Modular Integration of FC System Within Monuments Interfaces Definition and Description," the entire contents of which are hereby incorporated by reference.

FIELD OF THE DISCLOSURE

Embodiments of the present disclosure relate generally to the use of the fuel cell systems on board aircraft and other passenger transportation vehicles and to methods of using heat, air, and water generated by such fuel cell systems. The heat may be used to address condensation within the aircraft. The heat may be used to help evaporate excess water that would otherwise condense in the aircraft skin. The excess water collected may be used to create humidification for cabin air. In other examples, the heat, warmed air, or warmed water may be delivered to other locations or heating systems for beneficial use.

BACKGROUND

Passenger transportation vehicles, such as aircraft, has been exploring implementing the use of fuel cell systems on board. One benefit of the use of fuel cell systems is a cleaner, potentially less expensive, quieter, and more environmentally-friendly source of power. The use of fuel cell systems can supplement energy sources already aboard commercial aircraft. A fuel cell system produces electrical energy as a main product by combining a fuel source of liquid, gaseous, or solid hydrogen with a source of oxygen, such as oxygen in the air, compressed oxygen, or chemical oxygen generation. Fuel cell systems consume hydrogen ($H_2$) and oxygen ($O_2$) to produce electric power. A fuel cell system has several useful by-products output in addition to electrical power. For example, thermal power (heat), water, and oxygen-depleted air (ODA) are produced as by-products. These by-products are far less harmful than $CO_2$ emissions from current aircraft power generation processes. However, these other outputs often are not utilized and therefore become waste.

Moisture-related problems have been reported on commercial or passenger aircraft, including water dripping onto passengers, electrical equipment failures, and wet insulation blankets. All passenger aircraft will experience moisture-related problems in service, but the extent of these problems can vary. Primary sources of moisture may include passenger respiration, operation of humidification systems, air condition condensation, frost accumulation, and potential resulting condensation on the airplane skin. There are skin insulation blankets in service that can help manage moisture-related problems, but improvements are desirable.

Other problems that may exist on-board commercial or other passenger aircraft include cold entry way doors, cold floors, the potential for freezing water lines or water tanks, and other instances in which heated systems may be necessary.

BRIEF SUMMARY

Embodiments of the invention described herein thus provide systems and methods for using fuel cell system products and by-products for various applications. Heat, warmed water, and/or oxygen depleted air may be routed to various aircraft areas. For example, these products may be routed to insulation blankets on board the aircraft. These products may be routed to areas for floor heating, freeze protection, or other heated air uses.

In one example, there is provided a fuel cell by-product use system configured for managing aircraft moisture, comprising: a fuel cell system that creates electricity as a product, and water, heat, and oxygen depleted air as by-products; at least one fluid conduit for delivering the heat generated by the fuel cell to a skin insulation blanket in order to cause evaporation of moisture in the skin insulation blanket; and a collection system for capturing the evaporated moisture and delivering the moisture to an aircraft cabin air distribution system. There may also be provided a system for capturing heat from the fuel cell system and converting the heat to heated air for delivery to the skin insulation blanket system. The evaporated moisture may be recycled through the aircraft cabin air distribution system via delivery to a humidification system.

Another example provides a fuel cell by-product use system configured for managing aircraft heat, comprising: a fuel cell system that creates electricity as a product, and water, heat, and oxygen depleted air as by-products; a fluid conduit for delivering the heat generated by the fuel cell to a heating system. There may be provided a system for controlling the heat to be delivered to the heating system. In a specific example, the heating system can be a door heater or a floor heater. A heat exchanger may be used for transferring fuel cell heat to on-board water lines or water tanks.

Further examples provide a method for using heat on-board an aircraft, comprising: providing a fuel cell system that creates electricity as a product, and water, heat, and oxygen depleted air as by-products, wherein the fuel cell is fluidly connected to a skin insulation blanket system via one or more conduits; capturing heat from operation of the fuel cell system; delivering the heat to the skin insulation blanket system in order to cause evaporation of moisture in the skin insulation blanket; collecting captured evaporated moisture; and delivering the captured moisture to an aircraft cabin air distribution system for use in cabin humidification.

A further example provides a method for delivering heat for use as heated air to one or more door heaters or floor heaters, comprising: providing a fuel cell system that creates electricity as a product, and water, heat, and oxygen depleted air as by-products, wherein the fuel cell is fluidly connected to the one or more door heaters or floor heaters via one or more conduits; capturing heat from operation of the fuel cell system; delivering the heat to the one or more door heaters or floor heaters for delivering warmed air therethrough.

DETAILED DESCRIPTION

As background, aircraft cabins are insulated with insulation blankets that are installed on the inside of the aircraft skin. Due to condensation on the inside of the cabin, moisture can be collected inside the insulation blanket. The extra weight of the accumulated moisture inside the insulation blankets generally depends on airflow from the air conditioning system and other moisture generators on board the aircraft. The initial installation of the skin insulation blankets is used to remove excess moisture from the new aircraft. But even once the aircraft is in service, the system is needed to limit new moisture build-up (e.g., during aircraft parking and overnight).

As further background, re-circulated air on board an aircraft can become quite dry, which can be uncomfortable for passengers. Accordingly, there may be provided a humidity enrichment system or other humidifier intended to increase the humidity in the cabin for passenger comfort. However, this can also create accumulated moisture. In some instances, the accumulated moisture/water may weigh up to 1000 kg. This added weight means increased fuel costs for the airline, which is undesirable.

Humidification systems are a comfort enhancer, but add weight to the aircraft. Aircraft skin dryer systems/installations that address accumulated moisture also add weight to the aircraft, but are necessary in order to manage moisture. Both systems consume electricity and airflow from the air conditioning system in order to function.

Embodiments of this disclosure thus relate to capturing heat generated by a fuel cell system and transporting the heat to other on-board areas where the heat may be of use, instead of using electricity for the various uses at the area. For example, the by-product of heat generated by a fuel cell may be used to evaporate moisture/water that would otherwise condense in the aircraft skin. In another example, the by-product of the heat generated by fuel cells may be used to heat other aircraft areas, such as door, floors, water lines and tanks, the aircraft skin to prevent freezing, or any other uses.

Embodiments also relate to methods for re-using the evaporated water for re-circulation and use in connection with an on-board humidification system. Embodiments further relate to using the by-product of water generated by a fuel cell for use in an onboard humidification system.

Figure 1:
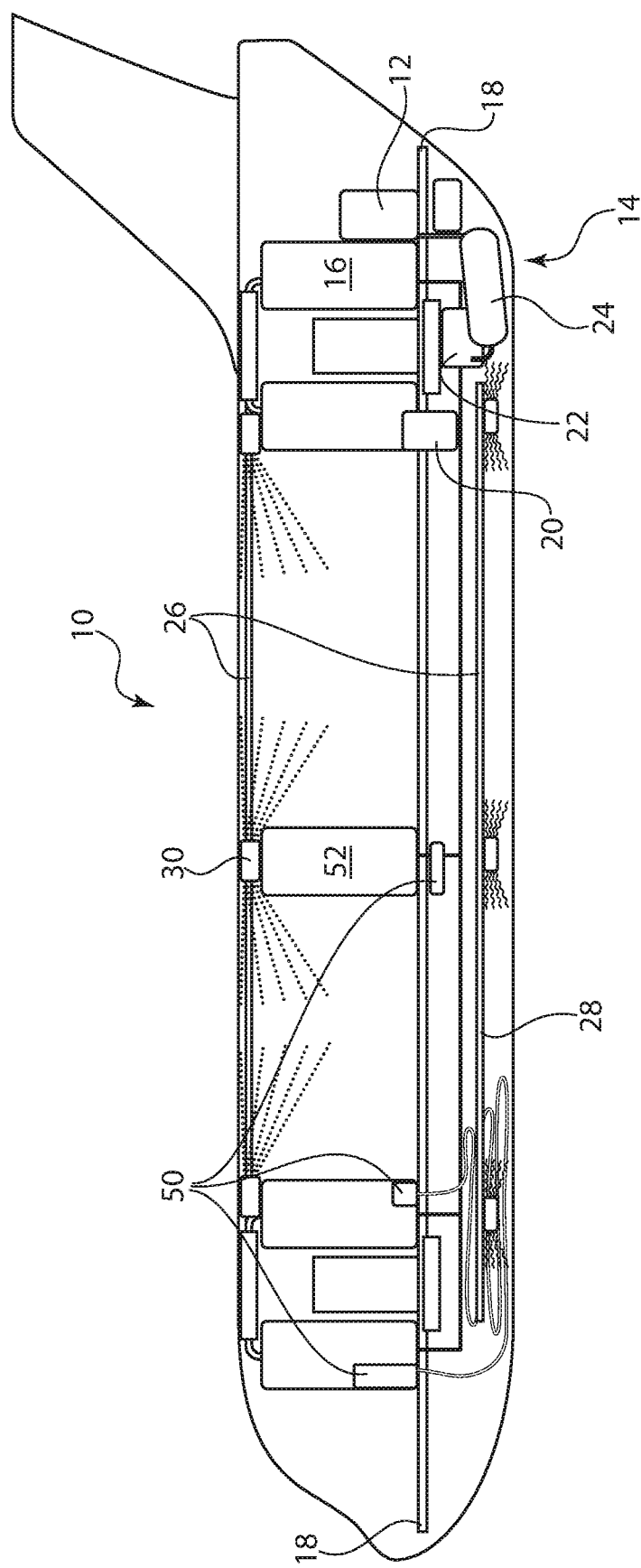
FIG. 1 shows a side view of an aircraft having one example of a fuel cell system by-product routing system as described herein.

FIG. 1 illustrates an aircraft 10 having a fuel cell system 12 installed at an aft portion 14. The fuel cell system 12 is illustrated as being positioned aft of an aircraft structure 16. The aircraft structure 16 may be an aircraft monument, a galley wall, a stowage compartment, a lavatory, or any other structure. Additionally or alternatively, the fuel cell system and/or additional related fuel cell components or auxiliary equipment may be positioned below the aircraft floor 18. For example, there may be an associated hydrogen storage 20 and fuel cell heat exchanger 22. The fuel cell system may also pull water from a water tank 24, a system already present on the aircraft. If all of these components are positioned at the aft portion 14 of the aircraft, there may be one or more cables or conduits that route electricity and/or useful by-products to the desired location.

In another example, various fuel cell components may be positioned throughout the aircraft, generally below the cabin floor 18. These sub-systems 50 may be installed at various locations along the aircraft. Examples of sub-systems include but are not limited to power converters. For example, FIG. 1 illustrates a sub-system converter 50 positioned below the aircraft floor 18 and associated with a mid-cabin galley 52. Because fuel cell systems are large and can consume valuable space on-board an aircraft when mounted inside the cabin area as a complete system, it is possible to split the fuel cell system components over several locations. For example, components 50 may be positioned near monuments, in cabin free space, underneath the floor area, in the cargo bay, or other locations. Some of these otherwise unused areas are not able to facilitate a complete fuel cell system 12, but may be able to hold specific system parts/components of the fuel cell system. Thus, when combined with dedicated interfaces to other locations, there may be provided a spread system without negatively affecting normal cabin usage. This can free value space that can be used for other relevant operations, such as catering equipment, passenger seats, and stowage areas.

The interfacing of fuel cell system 12 and/or one or more fuel cell components 50 with an aircraft system in order to allow use of the fuel cell system electricity and its useful by-products is provided. FIG. 1 illustrates an aircraft 10 with a cabin air distribution system 26. The cabin air distribution system 26 is generally provided as a series of conduits 28 that route air throughout various portions of the aircraft 10. The conduits 28 run through ceiling panels and/or below the aircraft floor 18. The cabin air distribution system 26 is provided for air pressurization as well as to maintain a desirable temperature of the cabin. It circulates air throughout the aircraft, including below the aircraft skin, below the floor, and within the cabin environment.

FIG. 1 further illustrates a humidification system 30. This system 30 distributes moisture into the cabin air in order to enrich the humidity of the air inside the cabin for passenger comfort.

Figure 2:
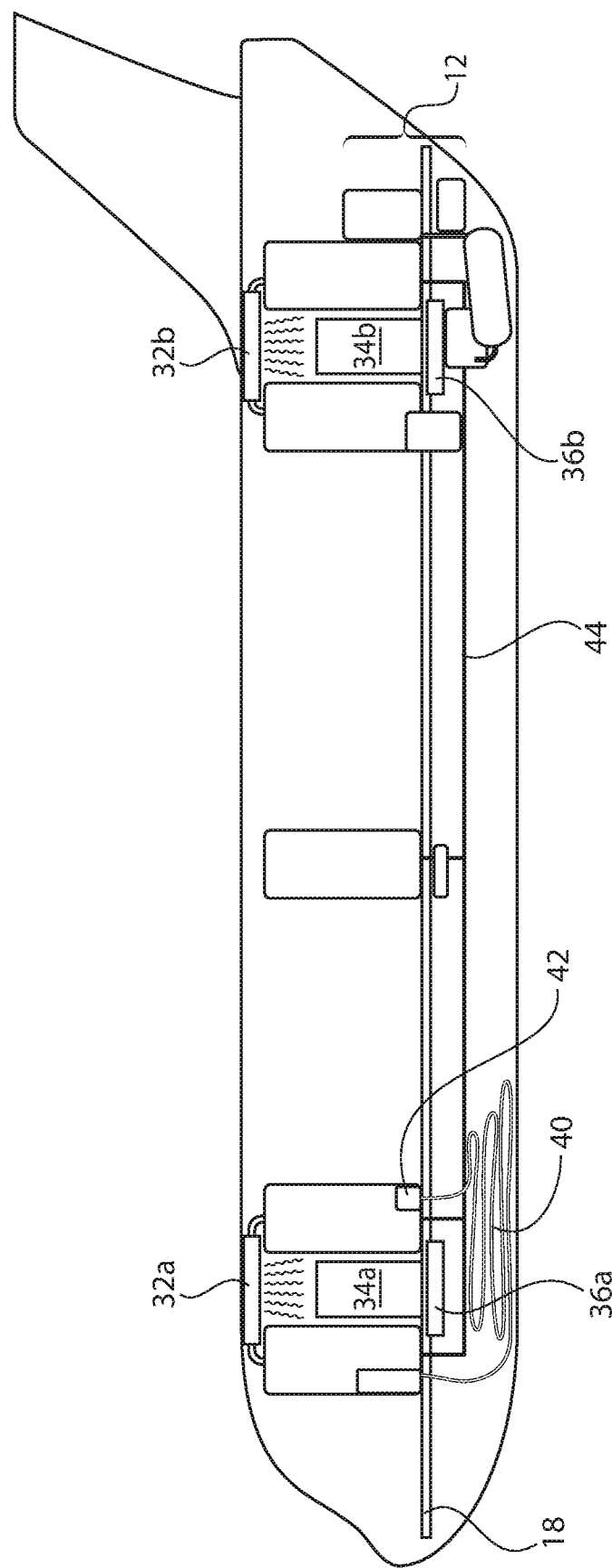
FIG. 2 shows a side view of an aircraft having another example of a fuel cell system by-product routing system as described herein.

FIGS. 1 and 2 further illustrate door heaters 32 positioned with respect to aircraft doors 34. There is provided a forward door heater 32A and an aft door heater 32B. Door heaters 32 may be provided because there is little insulation of the aircraft skin near doorways, and it can get cold in those regions. Additionally, during the boarding process in a cold climate, because the door must remain open for an extended period of time, crew and passengers can get cold and uncomfortable during this time. Door heaters 32 can provide a flow of heated air over the doorway. It is possible to route heat from the fuel cell system 12 or components 50 to door heaters 32. It is also possible to route fuel cell system exhaust air (oxygen depleted air "ODA") to assist the door heater airflow. In another example, a heater/heat exchanger may be positioned above one or more of the doors 34 in order to create a heated air curtain via the door heater. For example, a heat exchanger may be positioned inside a ceiling area with an appropriate conduit to allow the air to be delivered as desired. Such a system may also be used to heat the door sill itself.

FIGS. 1 and 2 further illustrate floor heaters 36 positioned at various points of the aircraft floor 18. In a specific example, a forward floor heater 36A may be positioned near a forward door 34A, and an aft floor heater 36A may be positioned near an aft door 34B. The floor heaters 36 may provide a flow of warmed air and/or may provide a warmed pad area. In either event, this can help alleviate freezing and cold temperatures at these areas.

Figure 3B:
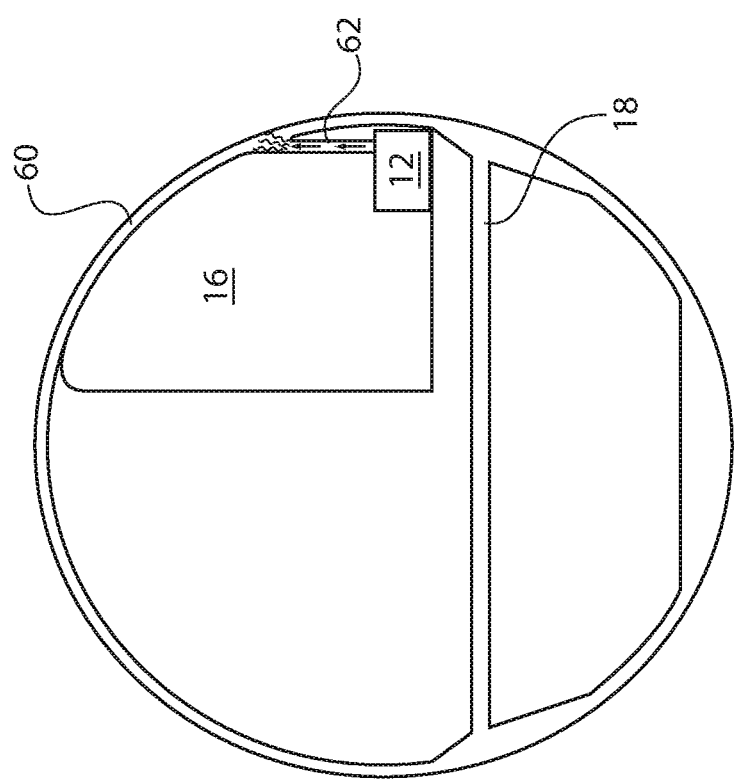
FIG. 3B shows a cross sectional view of an aircraft fuselage showing skin insulation blankets in place with a fuel cell system positioned above the cabin floor.
Figure 3A:
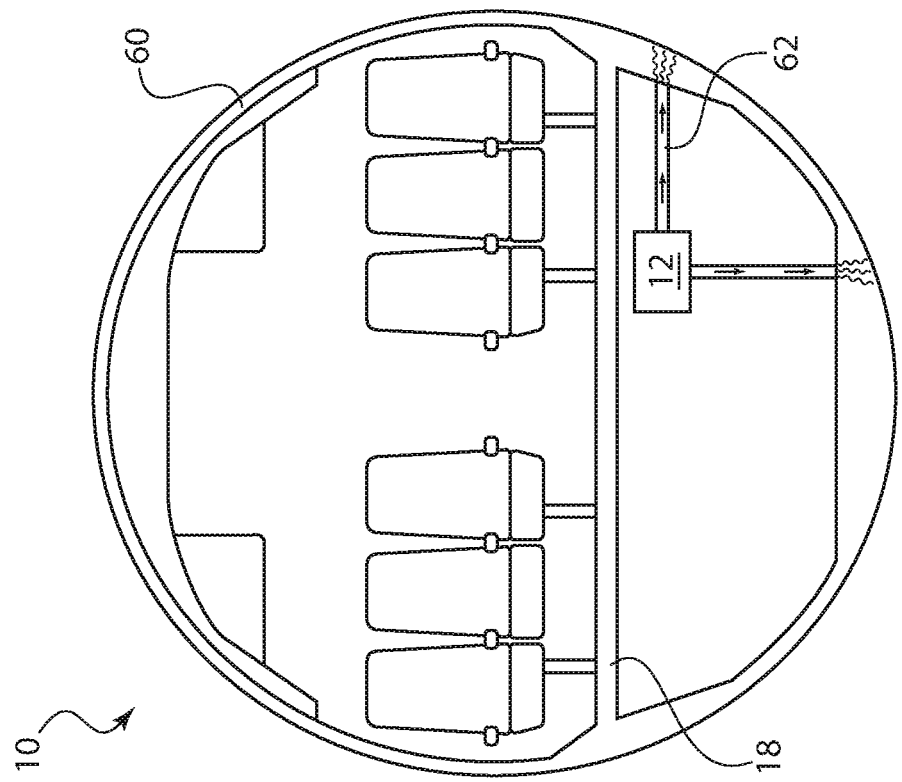
FIG. 3A shows a cross sectional view of an aircraft fuselage showing skin insulation blankets in place with a fuel cell system positioned beneath the cabin floor.
Figure 4:
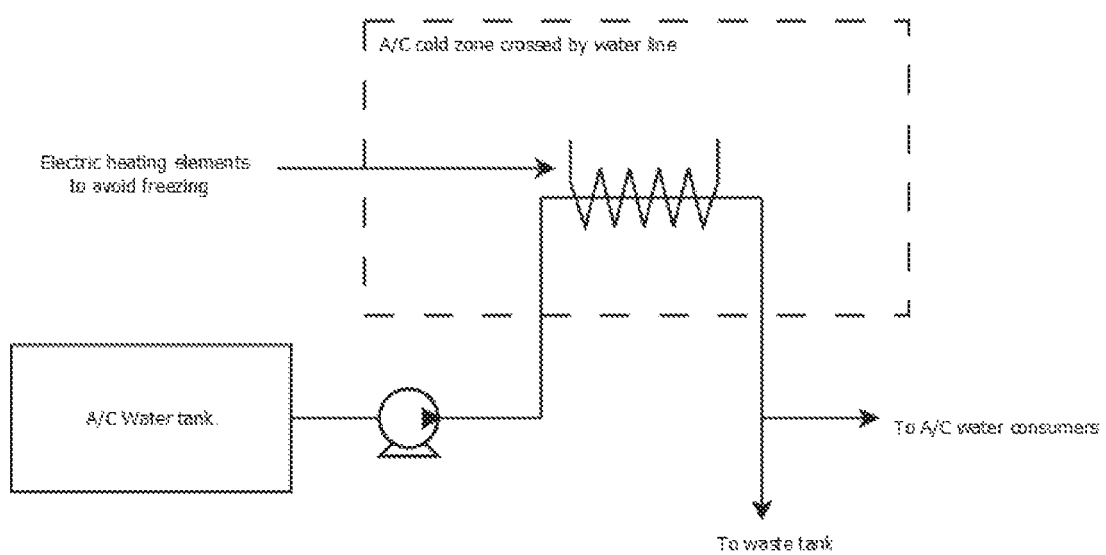
FIG. 4 shows a water line heating system of the prior art.

The above-described systems have traditionally made use of the aircraft electrical systems. However, the present disclosure uses the heat that is necessarily generated as a fuel cell by-product for these systems. Transporting the fuel cell heat, instead of electricity, to these areas can render the overall system more effective. In one example, as illustrated by FIG. 3, the fuel cell heat may be used to remove moisture from skin insulation blankets 60. FIG. 3A shows the fuel cell system 12 and/or related components positioned below the floor 18. FIG. 3B shows the fuel cell system 12 and/or related components positioned above the floor (also illustrated by FIG. 1.) It should also be understood that the fuel cell system 12 and/or related components may be positioned in ceiling compartments, side compartments, in other on-board compartments, or at any other appropriate location. One or more conduits 62 may be provided that deliver the heat to the blanket location in the aircraft skin and/or in the aircraft belly. In turn, the present disclosure can also reuse the water removed from insulation blankets to enrich the humidity in the cabin air, such that no additional water is required for the humidifying system 30. The present disclosure can also re-use the water generated as one of fuel cell by-products for humidifying cabin air.

In one example, the fuel cell system 12 may be operably connected to a skin insulation blanket drying system 60. It is possible to provide direct or indirect heating of the insulation blanket 60, depending on the fuel cell technology used. For example, if the fuel cell is an air-cooled fuel cell (meaning that cooling media is used to maintain the fuel cell operating temperature in the appropriate range), the hot air at the exhaust of the fuel cell could be directly blown in the insulation blanket system 60 through appropriate piping/conduits 62. If the fuel cell is a liquid-cooled fuel cell (meaning that the cooling media is in liquid form, such as water, water/ethylene glycol mixture, water/propylene glycol mixture or any other fluid), the heat collected in this media could be transferred to the air flowing through the insulation blanket system by means of a heat exchanger. The heat exchanged may be sized and installed appropriately. The heat may be collected and delivered/directed to areas of the aircraft skin. This can allow the heat to evaporate all or part of the water in the skin insulation blankets.

The water evaporated by the heat generated by the fuel cell system may then be collected by the cabin air distribution/regulation system 26. The water can be recycled and mixed with fresh incoming air to increase the humidity content of air delivered to the cabin/passenger area. For example, the humidity enrichment system 30 may re-use removed water from the insulation. This provides air inside the cabin that is more comfortable for the passengers, while also helping to reduce the water weight that needs to be carried. For example, the collected moisture may be released into the air via one or both of the cabin air distribution system 26 and/or the humidification system 30.

The humidification system 30 may include means to control and adjust the flow rate of moisture-containing air coming out of the skin insulation blanket system 60 and that is redirected into the air distribution system. The flow rate could be adjusted by valves provided in the various conduits. The valves may be operated based on a signal/information provided by one or several humidity sensors located in the cabin/passenger area or by any other logic not based on sensor signals. For example, the valves may be operated to open/close cycle based at specific times and/or at specific water (moisture) levels.

Alternatively, the water can be disposed out of the aircraft so as to "save" corresponding water weight. For example, all of a portion of collected moisture may be exhausted out of the aircraft via a drain mast or other system. Alternatively, all of a portion of collected moisture may be re-routed to other aircraft systems for re-use, such as for toilet flushing or other non-potable water usage.

The fuel cell system 12 may be operably connected to the cabin air distribution system 26 and/or the humidification system 30. The conduits 28 are already designed to bear moisture, and they may be used to route and deliver moisture recovered from the skin insulation blankets. It is possible for the collected moisture/water to be filtered prior to its use. The humidification system 30 can control the level of moisture delivered in order to ensure that appropriate levels are reached and maintained.

In another example, the fuel cell system heat may be transferred through a heat exchanger 42 to a fluid circuit 40. The fluid circuit 40 may run under the aircraft floor 18. The fluid circuit 40 may comprise a series of conduits that allows heated fluid to flow along a desired path 44.

Figure 5:
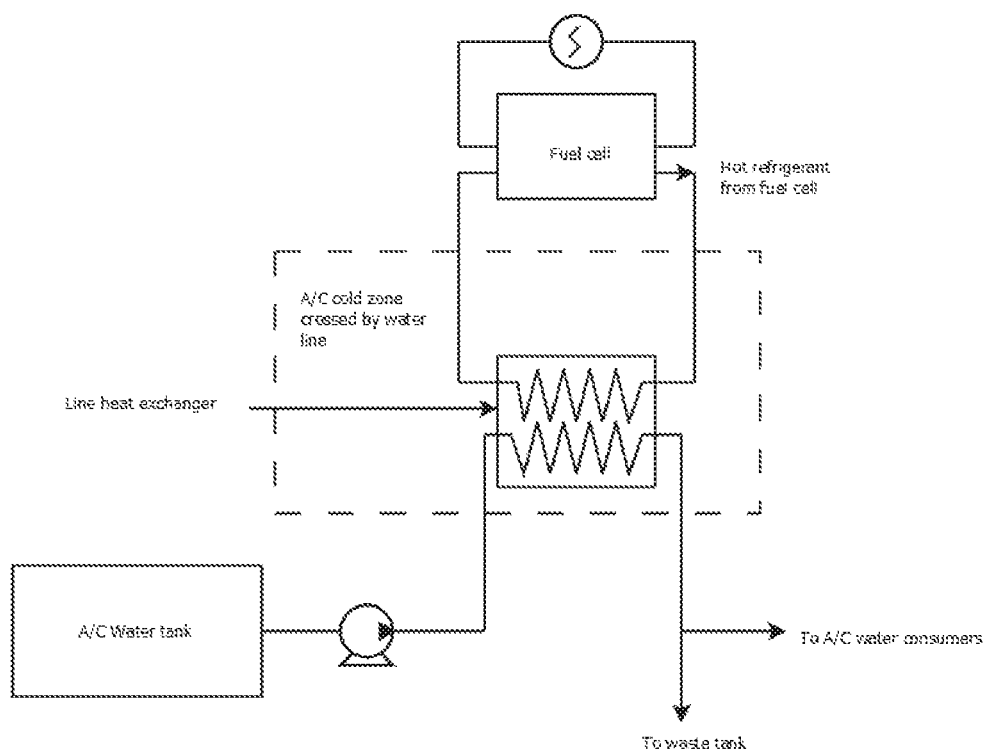
FIG. 5 shows one embodiment of a water line heating system according to this disclosure.
Figure 6:
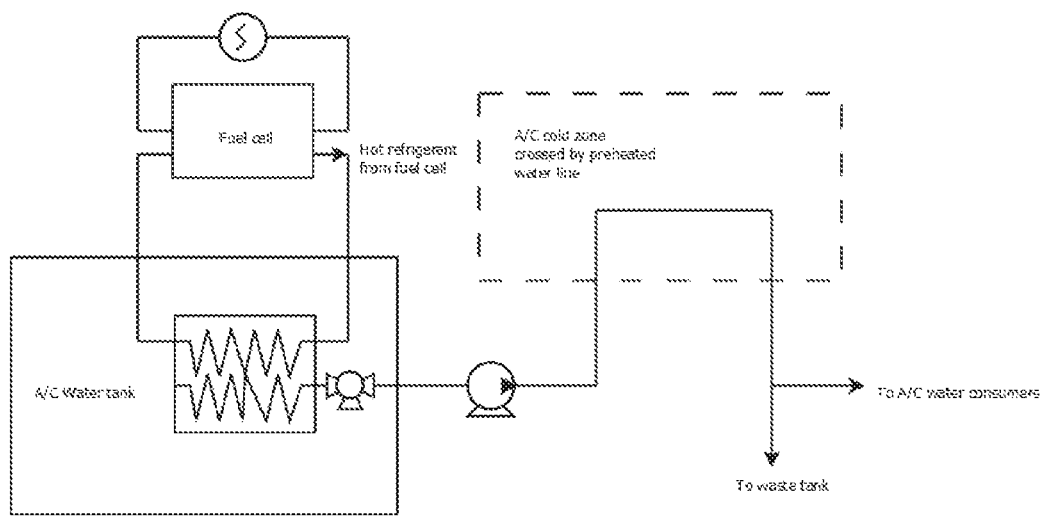
FIG. 6 shows one embodiment of a water tank heating system according to this disclosure.

In one example, the heat of the circulated fluid can be used to preheat water tubing. The heat of the circulated fluid can be used to provide freezing protection for water lines and/or water tanks 24, as illustrated by FIG. 2. As background, current water line and water tank heating systems use electric heating elements to avoid freezing of water in the lines. The heating elements use aircraft power for their operation. The present disclosure provides heating of water lines using hot refrigerant from the fuel cell system. For example, the heat exchanger may use coolant from the fuel cell heat system to deliver heat from the fuel cell and transfer it to cold water being stored in a water line or tank. This can allow hot water to be circulated in the water lines and can save the need for using electric powered water heaters. One example of a fuel cell system used to supply heat to a water line in an aircraft cold zone is illustrated by FIG. 5. One example of a fuel cell system used to supply heat to an aircraft water tank is illustrated by FIG. 6. In this example, the water lines are pre-heated such that when they cross a cold zone, they do not freeze.

Heat of the circulated fluid can be used to act as a dryer for accumulated moisture inside the insulation blankets and/or along the lower area (belly) of the aircraft cabin, as illustrated by FIG. 3. The heat of the circulated fluid can be used along the fuselage of the aircraft as a skin heat exchanger for aircraft anti-icing. The heat of the circulated fluid can be used for a door heater system for improved passenger and crew comfort and to avoid freezing, shown by FIG. 2. The heat of the circulated fluid can be used to blow a shield of air along monument doors or entryway doors or other surfaces to ensure they stay and remain dry. The heat of the circulated fluid can be used in combination with the fuel cell system exhaust air (ODA) to blow a shield of air along a door, monument, or other surface to ensure it stays dry. The heat of the circulated fluid can be used for floor heating. For example, the heat of the circulated fluid can be used for floor heating in front of chilled compartments and/or by entry ways or elsewhere along the aircraft floor.

The fuel cell systems described herein may be any appropriate fuel cell system, examples of which include but are not limited to PEMFC (Proton Exchange Membrane), SOFC (Solid Oxide), MCFC (Molten Carbonate), DMFC (Direct Methanol), AFC (Alkaline), PAFC (Phosphoric Acid) and any new fuel cell system technology comprising hybrid solutions. The fuel cell systems may be air-cooled or liquid-cooled variants of any of these types of fuel cells.

Changes and modifications, additions and deletions may be made to the structures and methods recited above and shown in the drawings without departing from the scope or spirit of the disclosure or the following claims.

What is claimed is:

1. A fuel cell by-product use system configured for providing an alternative way of managing aircraft moisture, comprising:
    a fuel cell system that creates electricity as a product, and water, heat, and oxygen depleted air as by-products;
    at least one fluid conduit for delivering the heat generated by the fuel cell to an insulation blanket installed on an inside of an aircraft skin in order to cause evaporation of moisture in the insulation blanket; and
    a collection system for capturing the evaporated moisture and delivering the moisture to an aircraft cabin air distribution system.

2. The system of claim 1, further comprising a system for capturing heat from the fuel cell system and converting the heat to heated air for delivery to the insulation blanket system.

3. The system of claim 1, wherein the at least one fluid conduit routes heated air beneath a cabin floor or within cabin walls or both.

4. The system of claim 1, wherein the evaporated moisture is recycled through the aircraft cabin air distribution system via delivery to a humidification system.

5. A method for using heat on-board an aircraft to provide an alternative way of managing aircraft moisture, the method comprising:
    providing a fuel cell system that creates electricity as a product, and water, heat, and oxygen depleted air as by-products, wherein the fuel cell is fluidly connected to an insulation blanket system via one or more conduits, the skin insulation blanket installed on an inside of an aircraft skin;
    capturing heat from operation of the fuel cell system;
    delivering the heat to the insulation blanket system in order to cause evaporation of moisture in the insulation blanket;
    collecting captured evaporated moisture; and
    delivering the captured moisture to an aircraft cabin air distribution system for use in cabin humidification.

6. The method of claim 5, further comprising converting the heat to heated air using a heat exchanger.

* * * * *